(12) United States Patent
Edwards et al.

(10) Patent No.: US 11,059,548 B2
(45) Date of Patent: Jul. 13, 2021

(54) WATERCRAFT LIGHTING SYSTEM

(71) Applicant: NIGHT FISHING SOLUTIONS, LaGrange, KY (US)

(72) Inventors: Stephen Edwards, Crestwood, KY (US); Joshua Honaker, Smithfield, KY (US); Stephen Warden, Louisville, KY (US); Eric Rouch, Louisville, KY (US); David Mikels, Louisville, KY (US); Gary O'Nan, Shelbyville, KY (US)

(73) Assignee: NIGHT FISHING SOLUTIONS, LaGrange, KY (US)

( * ) Notice: Subject to any disclaimer, the term of this patent is extended or adjusted under 35 U.S.C. 154(b) by 0 days.

(21) Appl. No.: 16/819,869

(22) Filed: Mar. 16, 2020

(65) Prior Publication Data

US 2020/0290710 A1    Sep. 17, 2020

Related U.S. Application Data

(60) Provisional application No. 62/819,399, filed on Mar. 15, 2019.

(51) Int. Cl.
| | |
|---|---|
| *B63B 45/04* | (2006.01) |
| *B63B 73/00* | (2020.01) |
| *F21S 43/19* | (2018.01) |
| *F21S 43/14* | (2018.01) |
| *F21Y 103/10* | (2016.01) |
| *F21W 107/20* | (2018.01) |
| *F21Y 115/10* | (2016.01) |

(52) U.S. Cl.
CPC .............. *B63B 45/04* (2013.01); *B63B 73/00* (2020.01); *F21S 43/14* (2018.01); *F21S 43/195* (2018.01); *F21W 2107/20* (2018.01); *F21Y 2103/10* (2016.08); *F21Y 2115/10* (2016.08)

(58) Field of Classification Search
CPC ........ B63B 45/04; B63B 73/00; F21S 43/195; F21S 43/14; F21Y 2103/10; F21Y 2115/10; F21W 2107/20
See application file for complete search history.

(56) References Cited

U.S. PATENT DOCUMENTS

| | | | |
|---|---|---|---|
| 2015/0016130 A1* | 1/2015 | Davis ...................... | B63B 45/02 |
| | | | 362/477 |
| 2015/0153442 A1* | 6/2015 | Scott ....................... | B63B 45/02 |
| | | | 342/41 |
| 2016/0090158 A1* | 3/2016 | Ortwein .................. | B63B 45/04 |
| | | | 362/477 |

* cited by examiner

*Primary Examiner* — Donald L Raleigh
(74) *Attorney, Agent, or Firm* — Witters & Associates; Steve Witters

(57) ABSTRACT

A watercraft light adapted to fit in a rub rail is provided. The watercraft light longitudinally extends in a portion of the rub rail and provides light to the exterior of the watercraft. A watercraft light system and method of installing the watercraft light are also presently disclosed.

19 Claims, 10 Drawing Sheets

WATERCRAFT LIGHTING SYSTEM

CROSS-REFERENCE TO RELATED APPLICATIONS

This application claims priority to provisional application Ser. No. 62/819,399, filed Mar. 15, 2019, which is hereby incorporated herein by reference in its entirety.

FIELD OF THE DISCLOSURE

This invention generally relates to watercraft lights, and, more particularly, to watercraft lighting systems configured to be installed with a rub rail of a watercraft.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Watercraft lighting, such as navigation lights, have typically been installed on watercraft for many years. Navigation lights are colored source of illumination on a watercraft. For example, a red light may be mounted on the left or port side of the watercraft, a green may be mounted on the right or starboard side, and a white light may be mounted to shine from astern.

Other watercraft lighting has been and is being used. For example, lights may be installed on a watercraft to illuminate the area around the watercraft. Typically, watercraft lights project from a surface or perimeter of the watercraft which may subject the watercraft lights to damage and/or be an inconvenience or obstacle.

SUMMARY

A watercraft light adapted to fit in a rub rail is provided. The watercraft light longitudinally extends in a portion of the rub rail and provides light to the exterior of the watercraft. A system and method of installing the watercraft are also presently disclosed.

In one aspect of the present disclosure, a longitudinally extending watercraft light adapted to fit in a rub rail is provided. The rub rail comprises a rub rail bumper held in a rub rail track. The longitudinally extending watercraft light comprises, at least one light and a longitudinally extending housing holding the at least one light therein. The rub rail light has a first side and a second side. The first side of the housing comprises an outwardly extending portion configured and disposed to be placed into the rub rail track. The second side of the housing comprises at least one light opening or light transmissible portion and is configured and disposed to be held in the rub rail track and adjacently align with cut ends of the rub rail bumper or an adjacent longitudinally extending housing. The second side of the housing is configured to transfer light from the at least one light to an area to be illuminated. A connector is configured and disposed to connect and hold the longitudinally extending watercraft light to the watercraft and electrical connecting lines extend from the at least one light.

In another aspect of the present disclosure, a method of installing a longitudinally extending watercraft light is provided. The method comprises the steps of: cutting and removing a portion of the rub rail bumper from the rub rail track; inserting an outwardly extending portion of the longitudinally extending watercraft light into the portion of the rub rail track having the rub rail bumper removed; abutting the cut ends of the rub rail bumper with ends of the longitudinally extending watercraft light and forming a substantially same outer perimeter with the rub rail bumper and the longitudinally extending watercraft light; connecting the longitudinally extending watercraft light to the watercraft; and electrically connecting the longitudinally extending watercraft light to a power source.

In a further aspect of the present disclosure, a longitudinally extending watercraft light bar adapted to fit in a rub rail is provided. The rub rail comprises a rub rail bumper held in a rub rail track. The longitudinally extending watercraft light comprises: a first longitudinally extending light transmissible section; a second longitudinally extending section; a longitudinally extending PCB; an array of LEDs disposed on the PCB, wherein each LED in the array is substantially equally spaced from one another about a longitudinal axis of the PCB; the first longitudinally extending section and the a second longitudinally extending section each having edges joined and substantially sealed together and housing the PCB with the array of LEDs proximate the first longitudinally extending section, disposing the LEDs to emit light though the first longitudinal section; and electrical connecting lines extending from the PCB and out of the joined first and the second longitudinally extending sections.

BRIEF DESCRIPTIONS OF THE DRAWINGS

The following figures, which are idealized, are not to scale and are intended to be merely illustrative of aspects of the present disclosure and non-limiting. In the drawings, like elements may be depicted by like reference numerals. The drawings are briefly described as follows.

DETAILED DESCRIPTION

Figure 1:
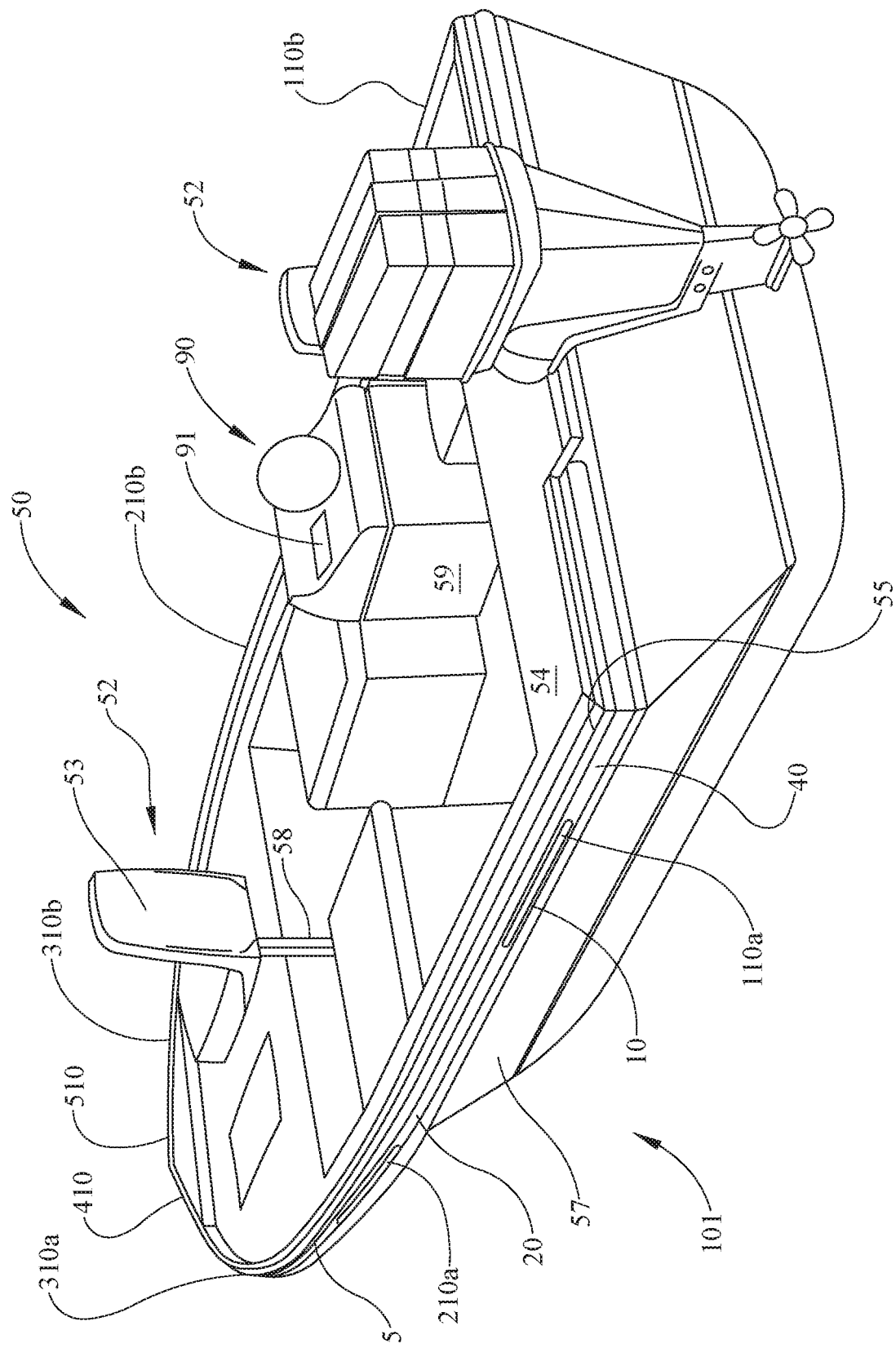
FIG. 1 is a perspective view of an installed watercraft lighting system of the present disclosure.

Disclosed herein is a watercraft lighting system, housing, light bar, and method of installation. Many, if not most, watercraft have a rub rail extending outwardly from portions of the hull of the watercraft. For example, a rub rail may be positioned on the hull of the watercraft to absorb physical shock or mitigate scraping or scratching of the hull of the watercraft. A rub rail may completely encircle the hull of the watercraft or may have portions positioned at selected locations, such as on the sides and front of the watercraft.

A rub rail typically has a rub rail base or track and an insert or rub rail bumper held in the base. The rub rail insert may have rubber like materials, polymeric, or metal materials such as stainless steel. In at least one aspect of the present disclosure, a watercraft lighting system is disclosed. The watercraft lighting system of the present disclosure may comprise one or more lights, or light bars, or sections, that may be held or housed in a rub rail base or track. In at least one embodiment of the presently disclosed watercraft lighting system, the one or more watercraft lights are held within a perimeter of the rub rail bumper.

In at least one embodiment of the present disclosure, the lighting system comprises at least one light bar configured to be held in a rub rail base. The light bar may be configured to be held in a rub rail base and within an outer surface or perimeter of a rub rail insert. For example, a light bar may be configured be held in a rub rail base and not extend outward past the rub rail insert.

The light bar may have an array of lights, such as a plurality of LEDs. It is to be understood that the light source of the present disclosure may comprise any light source known, or that may become known, to persons having ordinary skill in the art. The lights may have point or longitudinal extending light source. For example, light emitting diodes (LEDs) or quantum dots may provide point light sources and fluorescent lights may provide longitudinally extending light sources. An LED is a solid-state light that may comprise a conventional semiconductor light emitting diode or an organic or polymeric light emitting diode. The light source may be configured to provide colored light or white light. The light source may be configured to be brightened or dimmed or change colors. The light source may be controlled with a wired or wireless controller, such as a remote.

The rub rail base may have an open volume for receiving a portion of the one or more lights or one or more light bars. Often, the rub rail bases or tracks that are installed on watercraft may not have an open volume for receiving a portion of the presently disclosed watercraft lights or light bars. The lighting system of the present disclosure may include a rub rail base, or one or more portions of a rub rail base, having an open volume for receiving a portion of the one or more watercraft lights or light bars. Alternatively, an existing rub rail base void of an open volume may be altered or machined to have an open volume for receiving a portion of the one or more watercraft lights or one or more light bars. For example, one or more slots may be placed in the rub rail base or track.

In at least one embodiment of the watercraft lighting system of the present disclosure, the lighting system comprises at least one light. For example, the at least one light may be an array of lights, LEDs for example, on a printed circuit board, PCB. In at least one other embodiment of the watercraft lighting system of the present disclosure, the lighting system comprises at least one array of lights on a PCB enclosed to form a light bar. For example, a light bar may enclose the at least one light to shield the lights from the elements and/or to alter properties of the light being emitted from the at least one light. For example, the light bar may be configured to color the light and/or to refract the light with a lens.

In at least one embodiment of the watercraft lighting system of the present disclosure, the lighting system comprises at least one light bar configured fit in a rub rail base. In at least one other embodiment of the watercraft lighting system of the present disclosure, the lighting system comprises at least one light bar configured fit in a rub rail base and within an outer perimeter of a rub rail insert. Light bars may be configured to electrically communicate with one another.

In at least one other embodiment of the present disclosure, a longitudinally extending watercraft light adapted to fit in a rub rail is provided. The longitudinally extending watercraft light has at least one light in a longitudinally extending housing. For example, the housing may hold a watercraft light bar.

Rub rail inserts may be continuous, or uninterrupted, and extend around the perimeter, or portions of the perimeter, of a watercraft. For example, a metal, such as stainless steel, or polymeric rub rail insert or bumper may be a single piece extending around the perimeter or portions of the perimeter, of a watercraft. Apertures or slots may be placed in the rub rail insert for enabling the light from the one or more lights to illuminate the area around the watercraft.

Rub rail inserts or bumpers may be segmented and a plurality of rub rail segments may extend around the perimeter, or portions of the perimeter, of a watercraft. For example, segments of a metal or polymeric rub rail insert may be configured have its ends abut. In at least one embodiment of the present disclosure, the lighting system of the present disclosure has a segment of a rub rail insert as an outer part of a housing. The outer part of the housing is configured to have light pass therethrough, through a slot for example. Segments of a rub rail insert or watercraft lights may have ends abut which may provide an appearance of being a single length of rub rail.

The watercraft lighting system of the present disclosure may be installed on a watercraft forming an illuminated section of a rub rail. A rub rail on a watercraft typically comprises a rub rail base holding a rub rail insert. One or more lights may be held in a housing configured to be attached to a rub rail base on a watercraft and within a perimeter of a rub rail insert. Alternatively or additionally, one or more light bars may be installed in an existing rub rail bumper, wherein the rub rail bumper has a portion removed to allow light to pass through the rub rail bumper.

Reference will now be made in detail to the present exemplary embodiments and aspects of the present invention, examples of which are illustrated in the accompanying figures. The same reference numbers may be used in the figures to refer to the same or like parts. The presently disclosed embodiments, aspects, and features of the present invention are not to limit the presently claimed invention as other and different embodiments, aspects, and features will become apparent to one skilled in the art upon reading the present disclosure.

As used herein, a watercraft means typically a powered watercraft, such as a motor boat including, but not limited to, an inboard and outboard powered propeller-driven boat or jet boat, including a fishing boat, a recreational boat, a gondola, a houseboat, a speed boat including a ski boat, a patrol boat, a jetski, a swift boat, and a yacht. The disclosures in U.S. Pat. Nos. 8,277,098 and 9,598,156 are hereby incorporated herein by reference.

FIG. 1 shows a perspective view of an installed watercraft lighting system 101 of the present disclosure. Referring now to FIG. 1, a watercraft is shown as a motorized, propeller-driven fishing boat 50 that includes a hull portion 57 and a deck portion 54, deck portion 54 joined to hull portion 57 at a gunwale 51. The opening within the deck portion 54 defines an interior that includes a floor and one or more fishing locations 52 thereupon, fishing locations 52 generally comprising a seat 53 mounted upon a pedestal 58 wherein seat 53 is adapted to rotate about pedestal 58 giving a fisherperson seated upon seat 53 rotatably ready access for fishing in different directions without departing from seat 53. The interior may further have a control console 59 adapted to house the power, controls 91, and navigation controls 90 of boat 50 for moving from one fishing area to another. Control console 59 may have a fishing location 52 associated therewith.

Gunwale 51 has a gunwale edge 55 having a rub rail 40 affixed thereto. The rub rail 40 cooperates with rub rail insert 20. Rub rail 40 is configured to protect the gunwale 51 from damage when docking boat 50 alongside a dock or when placing boat 50 on a trailer for transportation behind a motor vehicle.

Lighting system 101 of the present disclosure may have lighting assembly 10 held in rub rail 40. Lighting assembly 10 may have one or more lights, such as an array of LEDs disposed on a PCB, which may be enclosed in a housing. Lighting assembly 10 may be configured and disposed to emit light through an elongated opening, slot, apertures, or transparent portion of the elongated rub rail 40.

In other embodiments of the present disclosure, a plurality of lighting assemblies 10 can be used on a watercraft. As shown in FIG. 1, one or a pair of lighting assemblies 110a, 110b can be installed along the port and/or starboard sides, near the middle or toward stern. An additional one or a pair of second lighting assemblies 210a, 210b can be installed along the port and/or starboard sides, more forward to the bow. One or a pair of third lighting assemblies 310a. 310b can be installed along the port and/or starboard sides, close to the bow. Another light assembly 410 can be installed at the bow on the port side and another lighting assembly 510 can be installed at the bow on the starboard side. On or more of the lighting assemblies may be configured selected, or different, colors of light. For example, lighting assembly 410 may serve as a red port running light and lighting assembly 510 may serve as a green starboard running light.

Figure 2A:
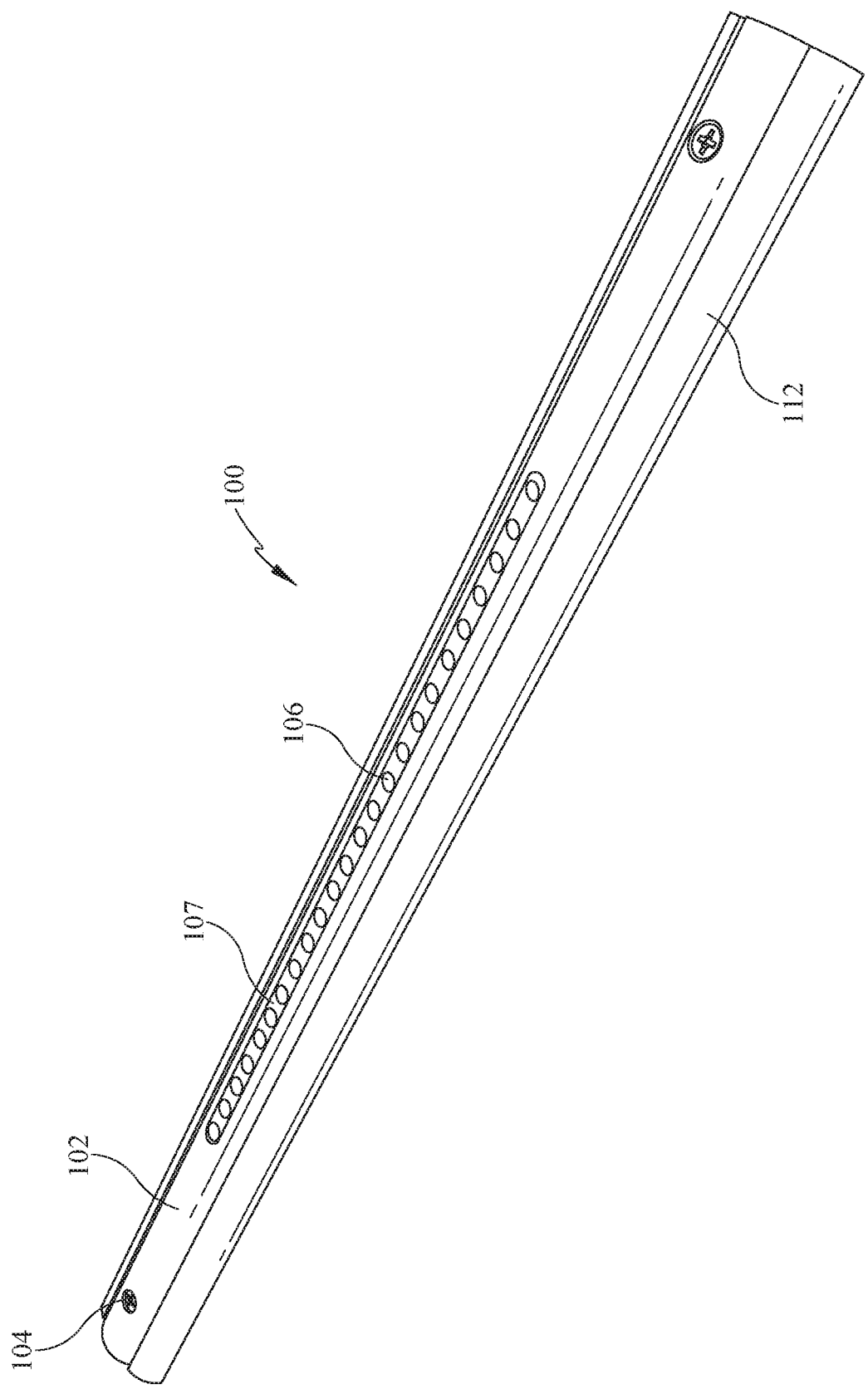
FIGS. 2a and 2b show upper perspective views of embodiments of the presently disclosed watercraft light.
Figure 2B:
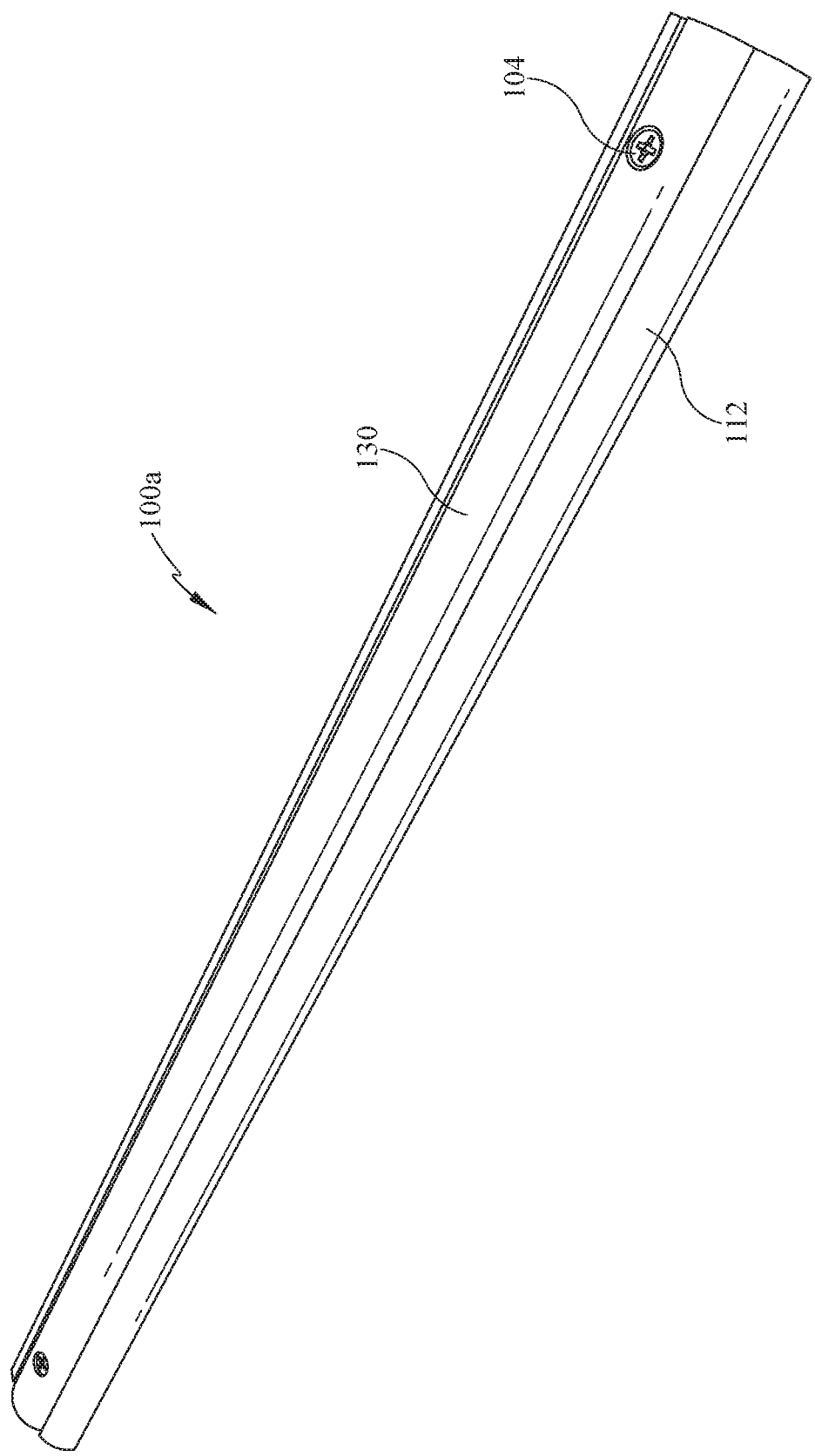
Figure 6:
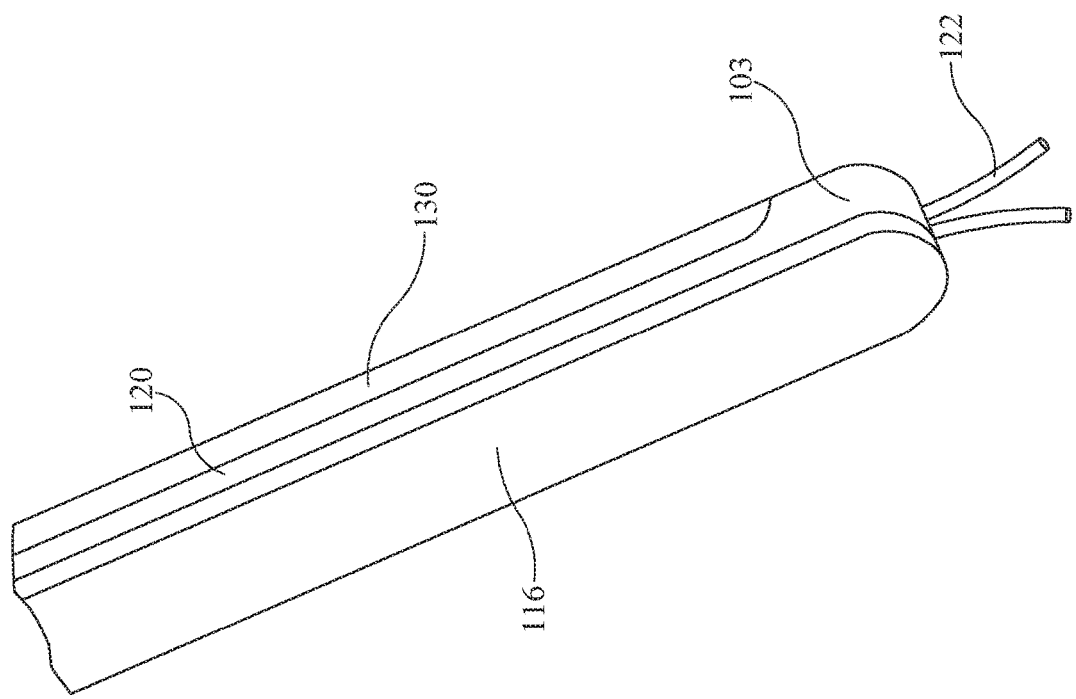
FIG. 6 shows an end portion of an embodiment of a watercraft light bar of the present disclosure.

In at least one embodiment, watercraft lighting system 101 has a plurality of the longitudinally extending watercraft lights 100 or 100a, and/or light bars 103, shown in FIGS. 2a, 2b, and 6. Each of the longitudinally extending watercraft lights 100 or 100a, and/or light bars 103 in lighting system may be electrically connected to a power source. In another embodiment, one or more of lights 100, 100a, and 103 may electrically connect together and a single connection to a power source may supply power to the lights that are electrically connected together.

For example, watercraft lighting system 101 may have a plurality of the longitudinally extending watercraft lights or light bars and each may have electrical connecting lines electrically connecting two or more of the lights together and the electrically connected lights may be electrically connect to a power source.

Figure 3:
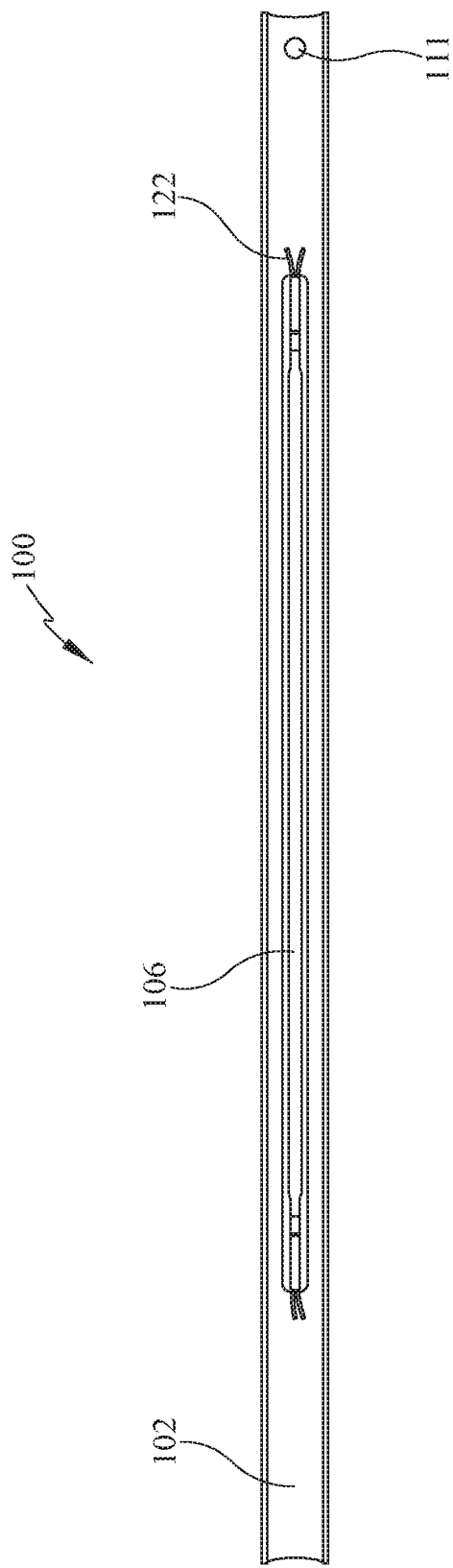
FIG. 3 shows a lower perspective view of the presently disclosed watercraft light.
Figure 4:
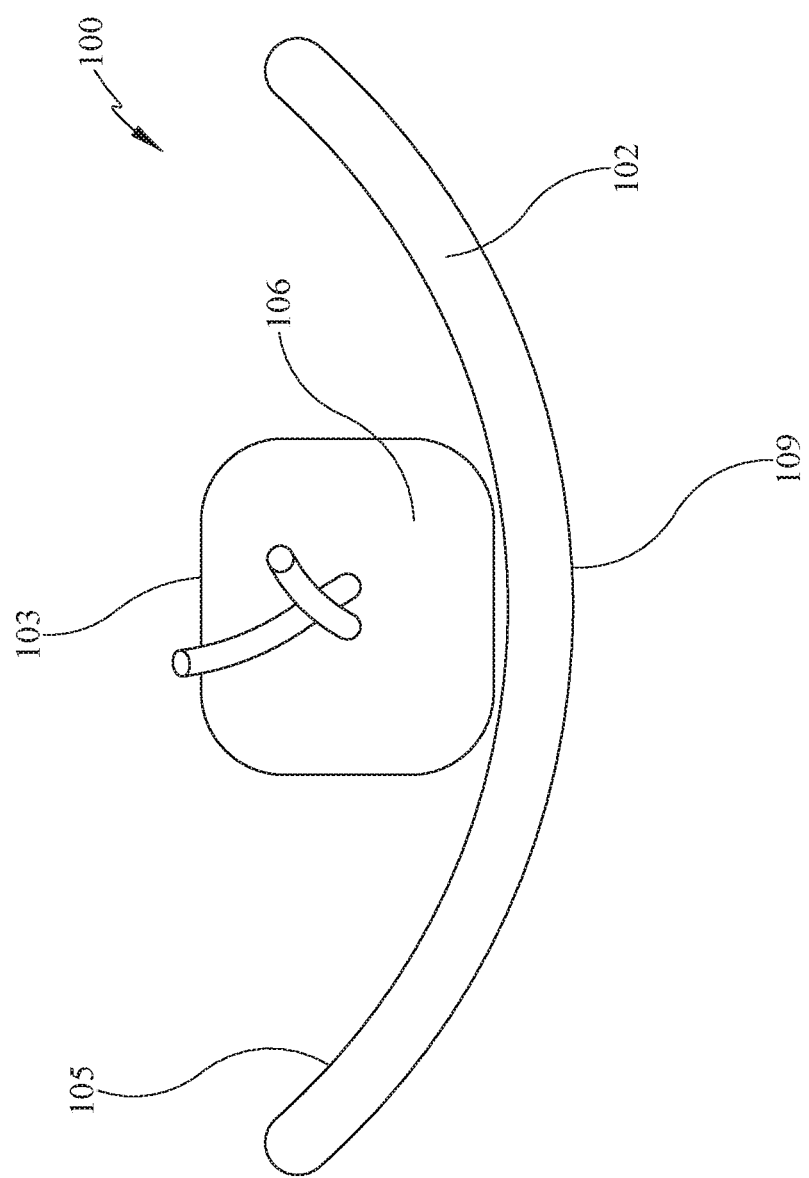
FIG. 4 shows an end perspective view of the presently disclosed watercraft light.

FIGS. 2a and 2b show upper perspective views of embodiments of the presently disclosed watercraft light 100 and 100a. FIG. 3 shows a lower perspective view of watercraft light 100 and FIG. 4 shows an end perspective view of watercraft light 100.

In at least one embodiment, a longitudinally extending watercraft light, 100, 100a, is adapted to fit in a rub rail 40. Rub rail 40 comprises a rub rail bumper 20 held in a rub rail track 112. Longitudinally extending watercraft light, 100, 100a, has at least one light 106. A longitudinally extending housing holds the at least one light 106 therein. For example, the housing may have rub rail insert 102 and a watercraft light bar 103, as shown in FIG. 4. Rub rail insert 102 has a first side 105 and a second side 109.

First side 105 of the housing comprises an outwardly extending portion configured and disposed to be placed into rub rail track 112. For example, inner portion 116 and outer portion 120 may extend from first side 105 and into rub rail track 112. Second side 109 of the housing comprises at least one light opening 107 or light transmissible portion and is configured and disposed to be held in rub rail track 112 and adjacently align with cut ends of rub rail bumper 20 or an adjacent longitudinally extending housing. For example, as shown in FIG. 1, lighting assemblies 110a and 110b are installed in rub rail 40 and appear as a part of rub rail bumper 20 as their outer surfaces abut and align.

Second side 109 of the housing is configured to transfer light from at least one light 106 to an area to be illuminated. A connector is configured and disposed to connect and hold longitudinally extending watercraft light, 100 and 100a, to watercraft 50. For example, longitudinally extending watercraft light of claim, 100 and 100a, may have at least one aperture 111 in second side 109 and at least one fastener 104 configured to extend through each aperture 111 and fasten longitudinally extending watercraft light, 100 and 100a, to watercraft 50. Electrical connecting lines 122 may extend from the at least one light 106 which may enable longitudinally extending watercraft light, 100 and 100a, to be electrically connected to a power source or another longitudinally extending watercraft light, 100 and 100a, installed in lighting system 101.

In at least one embodiment, longitudinally extending watercraft light, 100 and 100a, and the rub rail bumper 20 have the same outer cross-sectional perimeter. Additionally, longitudinally extending watercraft light, 100 and 100a, and the rub rail bumper 20 may have the same outer appearance, for example second side 109 and rub rail bumper 20 may both be metal such as stainless steel. Such an embodiment may provide a substantially seamless and continuous lighted rub rail 40.

In at least one embodiment, longitudinally extending watercraft light, 100 and 100a, has second side 109 with at least one opening, aperture, slot, or light transmissive portion 107 configured and disposed for transferring light from the at least one light 106. For example, second side 109 of longitudinally extending watercraft light, 100 and 100a, may have a centrally disposed slot opening 114 or longitudinally extending light transmissible portion for the transferring of the light from an array of LEDs to an area to be illuminated.

In at least one other embodiment, longitudinally extending watercraft light has a longitudinally extending light transmissible portion forming a substantially smoothed uninterrupted second side of the longitudinally extending watercraft light, as shown in FIG. 2b illustrating longitudinally extending watercraft light 100a.

A watercraft lighting system 101 may comprise a plurality of the longitudinally extending watercraft lights, 100 or 100a, wherein each have electrical connecting lines 122 configured and disposed to electrically connect two of the longitudinally extending lights, 100 or 100a, together or to electrically connect to a power source.

Embodiments or portions of embodiments of watercraft lighting system 101 are presently disclosed. Lighting system 101 of the present disclosure may have one or more watercraft lights 100, 100*a*, and/or light bars 103. For example, watercraft light 100 has rub rail insert 102 inserted and held in rub rail base 112. Light source 106 is held in rub rail base 112 and may have a plurality or array of LEDs configured and disposed to emit light through apertures or an opening, such as slot 107, in rub rail insert 102. Fasteners 104 may be used to fasten watercraft light 100 to the side of the watercraft. In at least one embodiment, fasteners 104 are not needed as rub rail insert 102 may be configured to hold light source 106 in rub rail base 112.

It is to be understood that watercraft light 100 may have a length sufficient to extend a substantial length of a watercraft and may have a plurality of openings or slots 107. A light source 106 may be held in base 112 for emitting light from each opening or slot 107. For example, the lighting system of the present disclosure may have base 112 extending substantially around a perimeter of a watercraft and have a continuously extending rub rail insert 102 held therein. A plurality of openings, apertures, slots, or light transmissive portions 107 may be in rub rail insert 102 and a plurality of light sources 106 may be held in base 112, with each light source 106 being disposed to emit light through a different opening, aperture, slot, or light transmissive portion 107.

In at least one embodiment of the lighting system of the present disclosure, the lighting system has a plurality of lengths of rub rail inserts 102. Each length of rub rail insert 102 may be configured to have ends abut a cut end of an existing rub rail insert or bumper 20 or an adjacent rub rail insert 102. For example, an existing length of rub rail bumper 20 may be removed from watercraft 50 and a length of rub rail insert 102 having opening 107 may be put in place of the removed length to have its ends abut with the ends of the existing rub rail bumper 20.

Figure 5:
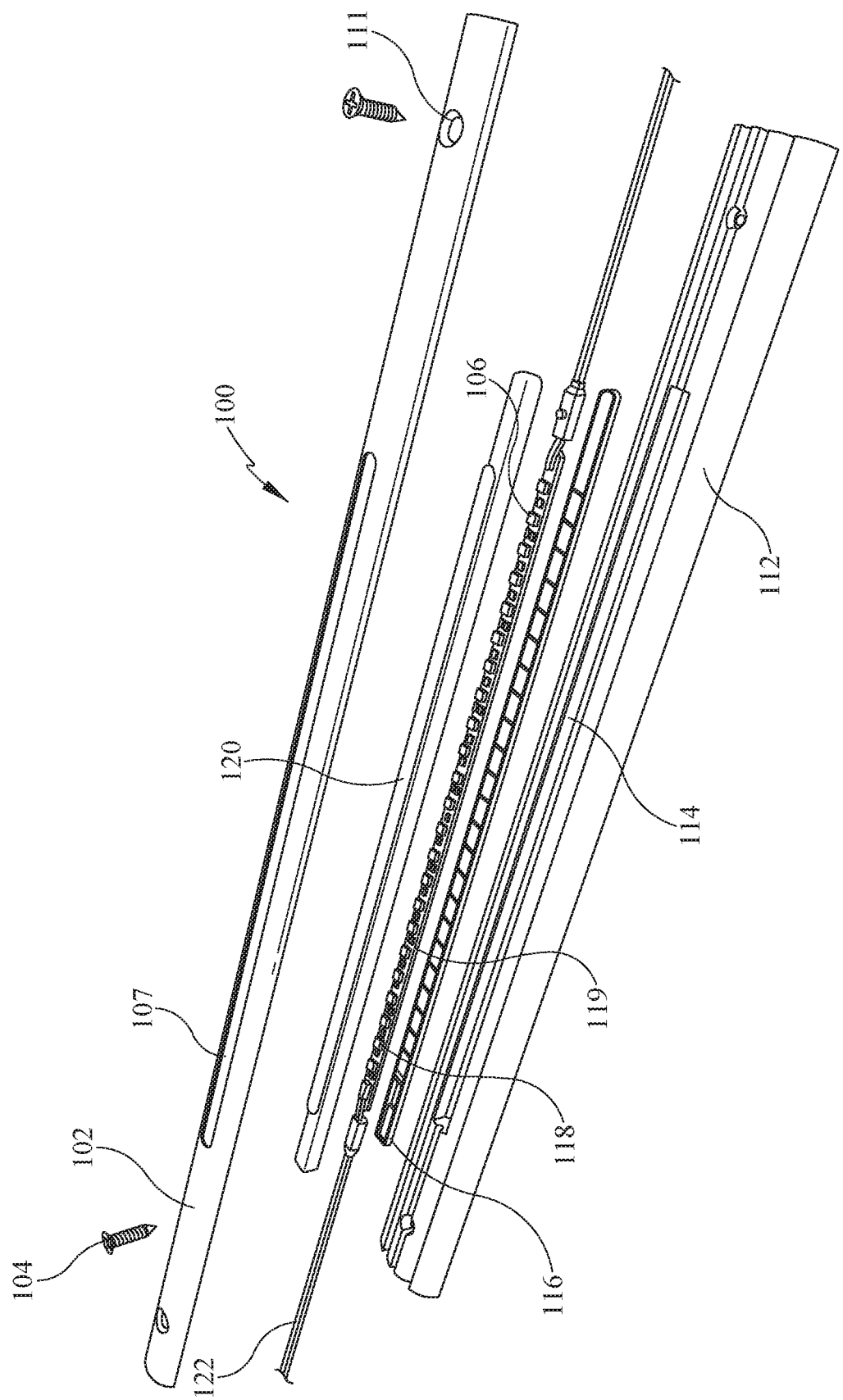
FIG. 5 shows an exploded view of the presently disclosed watercraft light.

FIG. 5 shows an exploded view of longitudinally extending watercraft light 100. Water craft light 100 may have rub rail insert 102 with opening, aperture, slot, or light transmissive portion 107 centrally positioned therein. Outer portion or first section 120 may provide an outer enclosure for a light source. For example, PCB 119 may have an array 118 of LEDs, wherein each LED is substantially equally spaced from one another and disposed centrally with longitudinally extending watercraft light 100. Inner portion 116 may be adapted to join with outer portion 120 and hold light source 106.

For example, inner portion 116, outer portion 120, and a light source 106, such as PCB 119, may be assembled to form a longitudinally extending watercraft light bar adapted to fit in a rub rail. In at least one embodiment, a watercraft light bar 103 is adapted to fit in rub rail 40. Rub rail 40 comprises a rub rail bumper 20 held in a rub rail track 112. Longitudinally extending watercraft light bar 103 has a first longitudinally extending light transmissible section 120 and a second longitudinally extending section 116. Longitudinally extending PCB 119 disposes an array of LEDs 118 thereon, wherein each LED in the array is substantially equally spaced from one another about a longitudinal axis of PCB 119. First longitudinally extending section 120 and second longitudinally extending section 116 each have edges joined and substantially sealed together and housing PCB 119 with array of LEDs 118 proximate first longitudinally extending section 120, disposing LEDs 118 to emit light though first longitudinal section 120. Electrical connecting lines 122 extend from PCB 119 and out of the joined first and the second longitudinally extending sections, 120 and 116.

Figure 7:
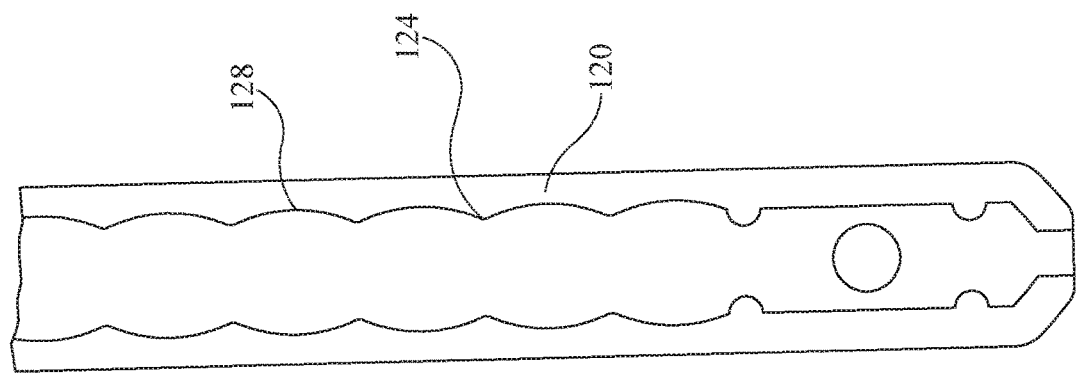
FIG. 7 shows a portion of an embodiment of a longitudinally extending light transmissible section that may be incorporated with the watercraft light shown in FIGS. 2a and 2b or the watercraft light bar shown in FIG. 6.

FIG. 6 shows an end portion of an embodiment of a watercraft light bar of the present disclosure and FIG. 7 shows a portion of an embodiment of a longitudinally extending light transmissible section that may be incorporated with the watercraft light shown in FIGS. 2*a* and 2*b* or watercraft light bar 103.

An end portion of light bar 103 is shown in FIG. 6 and an end portion of outer portion or first section 120 is shown in FIG. 7. First longitudinally extending light transmissible section 120 may have a lens configured and disposed to refract light emitted from array of LEDs 118. Longitudinally extending watercraft light bar 103 may have a one way reflective material 130 disposed about array of LEDs 118. Longitudinally extending watercraft light bar 103 may have flexible joined first and the second longitudinally extending sections, 120 and 116, and PCB 119. For example, light bar 103 may be flexible by an amount to flex and fit within a curved rub rail bumper as may be found on a curved gunwale 51.

In at least one embodiment of the present disclosure, light source 106 is held with inner portion 116, which extends inward from rub rail insert 102. Outer portion 120 may have a lens for refracting light. For example, outer portion 120 may have ridges 124 and troughs 128, as shown in FIG. 7. Outer portion 120 may be configured to color the light being emitted from light source 106. Outer portion 120 may have a translucent material configured to color the exposed outer surface of light source 106, without substantially coloring the light being emitted from light source 106. For example, light source 106 may have a translucent metallic material 130, such as a two way mirror film or material, which may have a similar appearance as a rub rail insert 102. For example, the rub rail bumper 20 may be stainless steel, rub rail insert 102 may be stainless steel, and light source 106 may be covered with a two mirror material, such as a film, to provide the appearance of a continuous stainless steel rub rail. The translucent material may be configured to cause light source 106 to not be discernible from rub rail insert 102 when not illuminated and provide minimal effect on the light being emitted.

Figure 8:
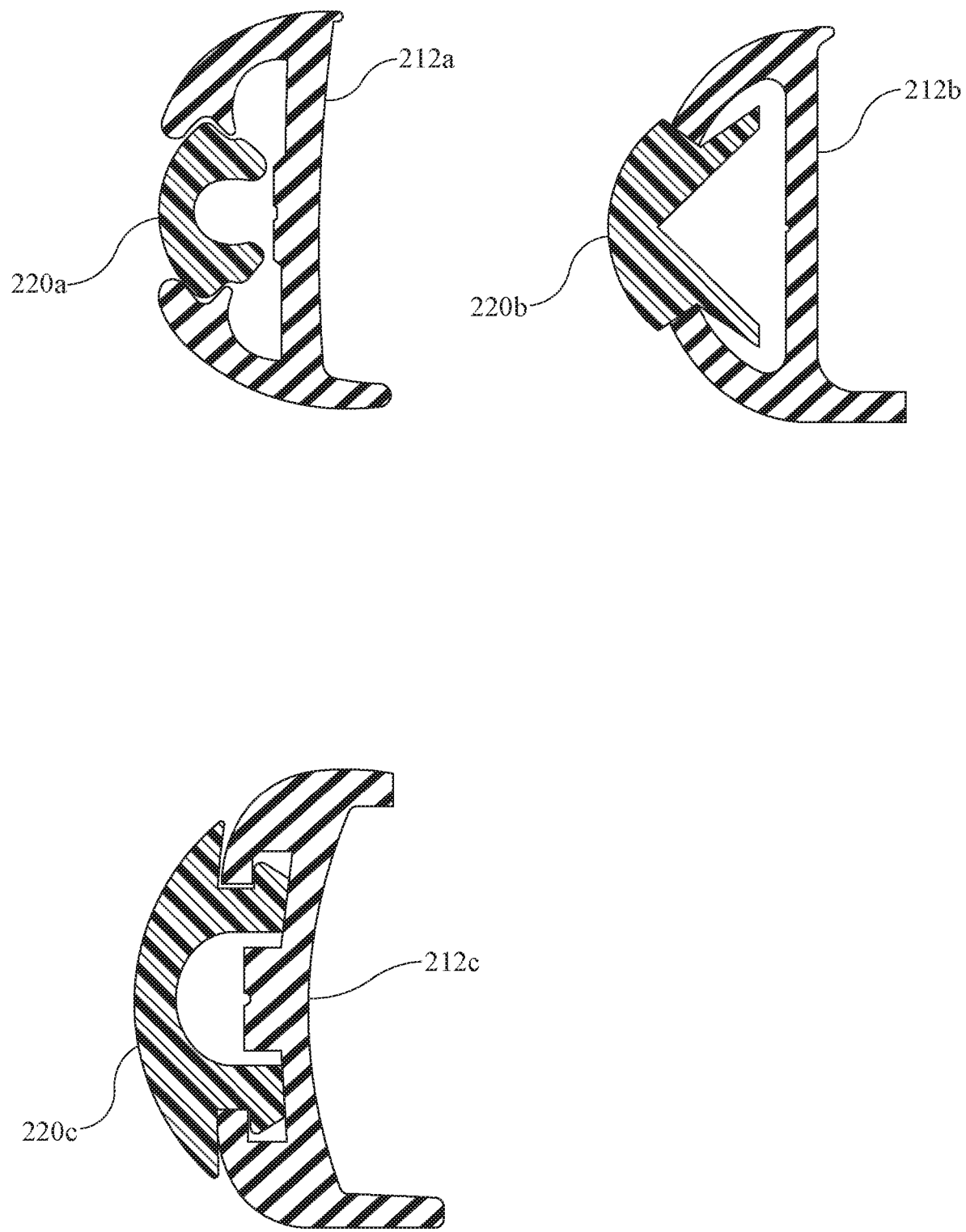
FIGS. 8 and 9 show example cross-sectional views of rub rail bases or tracks and inserts or bumpers with which the presently disclosed watercraft lighting system may comprise or be adapted to fit.
Figure 9:
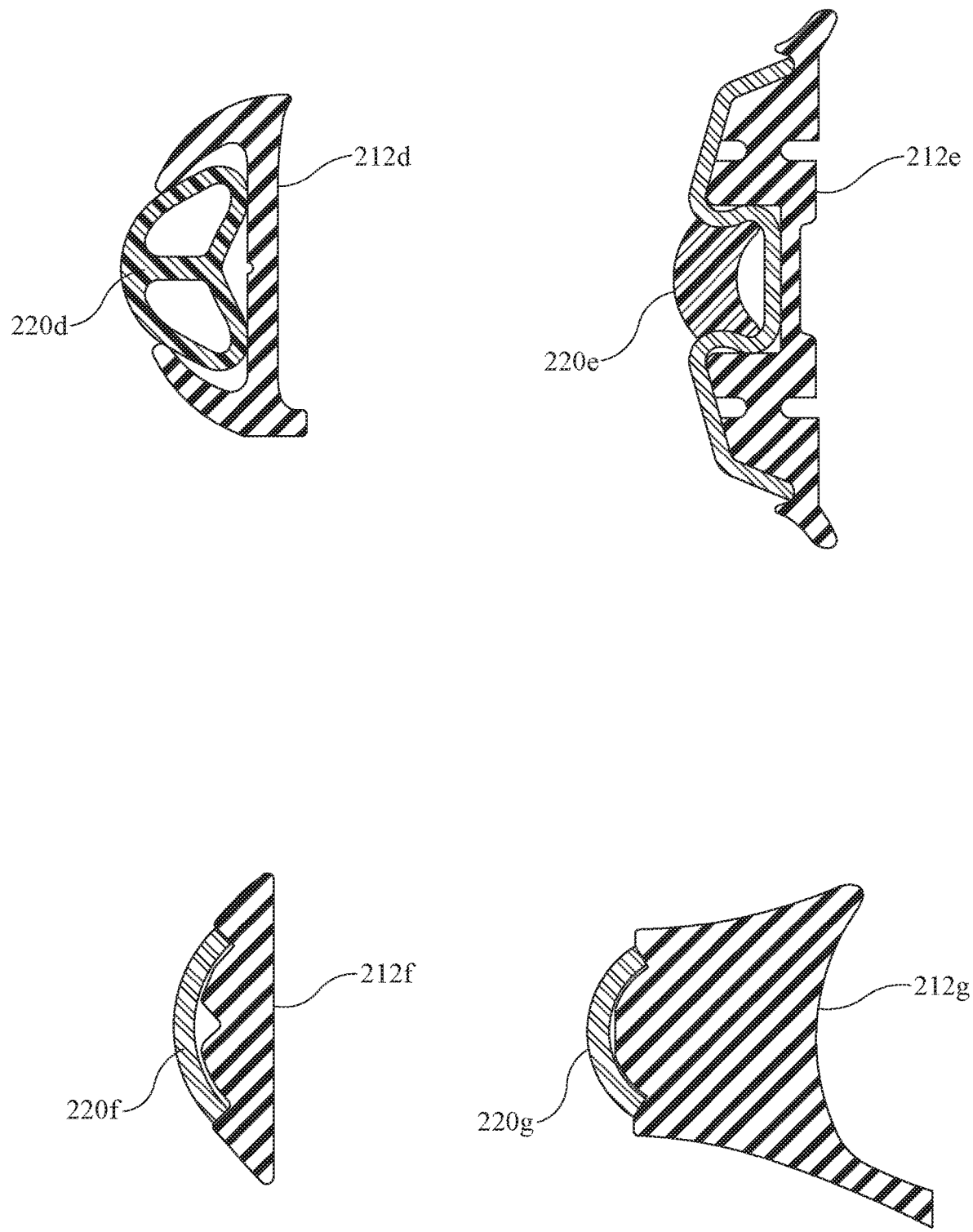

FIGS. 8 and 9 show example cross-sectional views of rub rail bases or tracks and inserts or bumpers with which the presently disclosed watercraft lighting system may comprise or be adapted to fit. For example, the longitudinally extending watercraft light of the present disclosure may have a configuration to fit with one or more of rub rail tracks 212*a* trough 212*g*. Rub rail insert 112 may be shaped to have an outer perimeter like an outer perimeter of one of rub rail bumpers 220*a* through 220*g* to provide a rub rail light that substantially seamlessly fits with the rub rail bumper in the rub rail track.

Figure 10:
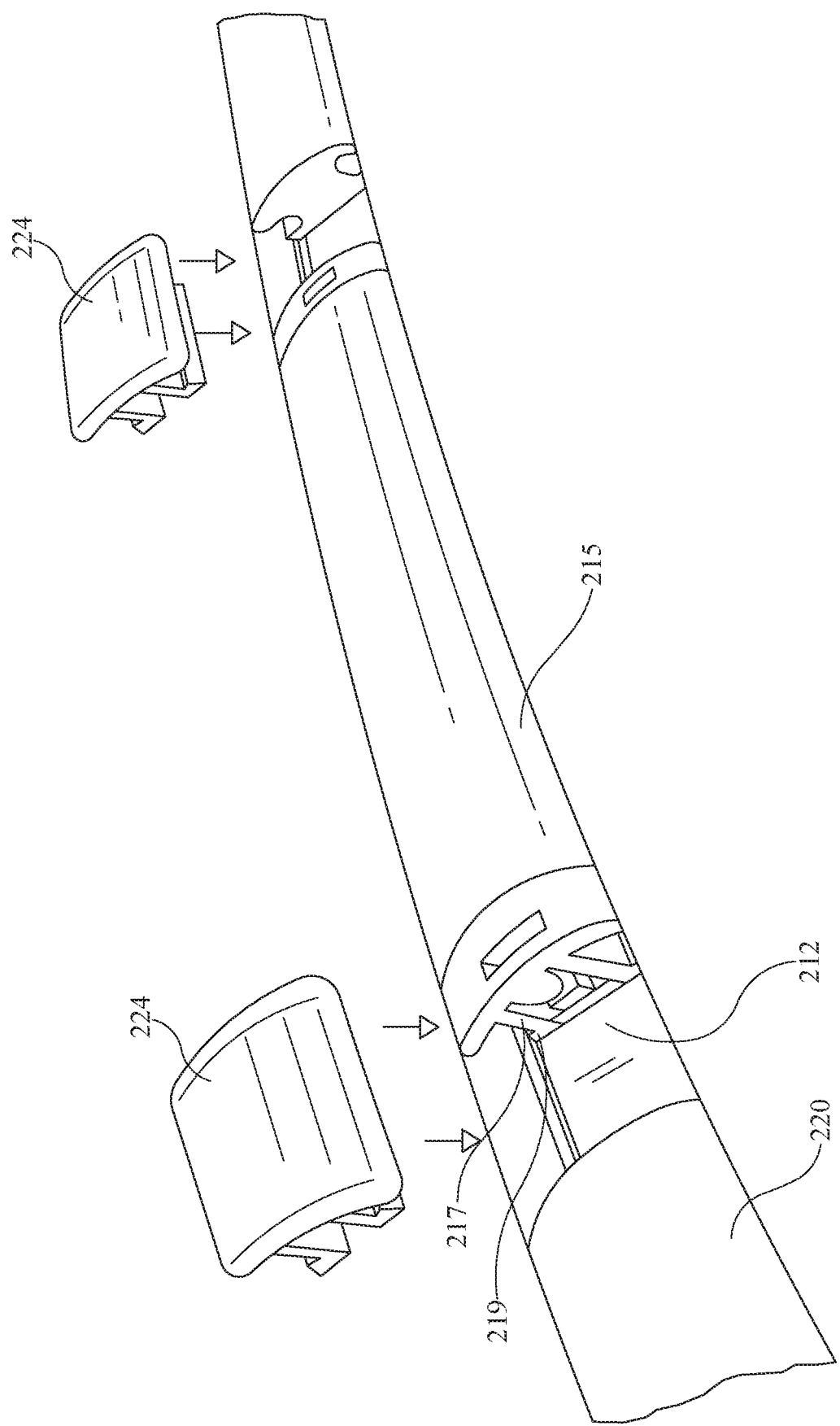
FIG. 10 shows an alternative embodiment of the presently disclosed watercraft lighting system.

FIG. 10 shows an alternative embodiment of the presently disclosed watercraft lighting system. A portion of rub rail insert or bumper 220 has been removed from rub rail track 212. Snap-in rub rail light 215 has snap mount 217, adapting snap-in rub rail light 215 to be snapped into rub rail track 212 and be held to the watercraft. Snap mount or connector 217 may have a pair of opposed extending arms that are adapted to snap into rub rail track 212. A pair of snap-in retainers 224 may be provided. Snap-in retainers 224 may have hooks on inner edges and teeth or a rubber side. It is to be understood that other and different connectors may be provided for connecting the rub rail light of the present disclosure to the rub rail track. For example, a connector may comprise a clip extending from the first side of the housing. Illustratively, extensions or protuberances 219 may extend outwardly from inner portion 116 and be disposed to be placed into the rub rail track and to snap or clip and hold the longitudinally extending watercraft in the rub rail track.

A method of installing a longitudinally extending watercraft light is presently disclosed. The method of installing a longitudinally extending watercraft light comprising the steps of: cutting and removing a portion of the rub rail bumper from the rub rail track; inserting an outwardly extending portion of the longitudinally extending watercraft light into the portion of the rub rail track having the rub rail bumper removed; abutting the cut ends of the rub rail bumper with ends of the longitudinally extending watercraft light and forming a substantially same outer perimeter with the rub rail bumper and the longitudinally extending watercraft light; connecting the longitudinally extending watercraft light to the watercraft; and electrically connecting the longitudinally extending watercraft light to a power source.

Connecting the longitudinally extending watercraft light to the watercraft may comprise fastening the longitudinally extending watercraft light to the watercraft with at least one fastener. Alternatively, or additionally, connecting the longitudinally extending watercraft light to the watercraft may be performed by snapping an outwardly extending portion of the longitudinally extending watercraft light into the rub rail track.

AT LEAST PARTIAL NOMENCLATURE

| | |
|---|---|
| rub rail insert or bumper | 20 |
| a rub rail | 40 |
| fishing boat | 50 |
| gunwale | 51 |
| fishing locations | 52 |
| seat | 53 |
| deck portion | 54, |
| gunwale edge | 55 |
| a hull portion | 57 |
| pedestal | 58 |
| control console | 59 |
| navigation controls | 90 |
| controls | 91 |
| lighting system | 101 |
| lighting assemblies | 110a, 110b |
| lighting assemblies | 210a, 210b |
| lighting assemblies | 310a, 310b |
| light assembly | 410 |
| lighting assembly | 510 |
| watercraft light | 100, 100a |
| rub rail insert | 102 |
| watercraft light bar | 103 |
| fasteners | 104 |
| first side of rub rail insert | 105 |
| light source or at least one light | 106 |
| opening, slot, aperture, or light transmissible portion | 107 |
| second side of rub rail insert | 109 |
| aperture | 111 |
| rub rail base or track | 112 |
| opening or void | 114 |
| inner portion or second section | 116 |
| one or more lights or array of lights | 118 |
| outer portion or first section | 120 |
| Wires, electrical connecting lines | 122 |
| ridges | 124 |
| plurality or array of LEDs | 118 |
| PCB | 119 |
| troughs | 128. |
| translucent metallic material, or one way reflective material | 130 |
| rub rail insert or bumper | 220 |
| snap-in retainer | 224 |
| rub rail track | 212 |
| snap-in rub rail light | 215 |
| snap mount or connector | 217 |
| protuberance | 219 |

The invention claimed is:

1. A longitudinally extending watercraft light adapted to fit in a rub rail;
   the rub rail comprises a rub rail bumper held in a rub rail track;
   the longitudinally extending watercraft light comprises:
      at least one light;
      a longitudinally extending housing holding the at least one light therein and having a first side and a second side;
      the first side of the housing comprises an outwardly extending portion configured and disposed to be placed into the rub rail track;
      the second side of the housing comprises at least one light opening or light transmissible portion and is configured and disposed to be held in the rub rail track and have its ends abut with cut ends of the rub rail bumper or abut with an end of an adjacent longitudinally extending housing;
      the second side of the housing being configured to transfer light from the at least one light to an area to be illuminated;
      a connector configured and disposed to connect and hold the longitudinally extending watercraft light to the watercraft; and
      electrical connecting lines extending from the at least one light.

2. The longitudinally extending watercraft light of claim 1, wherein the longitudinally extending housing and the rub rail bumper have the same outer cross-sectional perimeter.

3. The longitudinally extending watercraft light of claim 1, wherein the first side of the longitudinally extending housing is metal.

4. The longitudinally extending watercraft light of claim 1, wherein the connector comprises at least one aperture in the second side and at least one fastener configured to extend through each aperture and fasten the longitudinally extending watercraft light to the watercraft.

5. The longitudinally extending watercraft light of claim 1, wherein the connector comprises a snap mount extending from the first side of the housing and is configured disposed to be placed into the rub rail track and to connect and hold the longitudinally extending watercraft light in the rub rail track.

6. The longitudinally extending watercraft light of claim 1, wherein the second side of the housing has at least one opening, aperture, slot, or light transmissive portion, configured and disposed for transferring light from the at least one light.

7. The longitudinally extending watercraft light of claim 1, wherein the at least one light comprises at least one LED.

8. The longitudinally extending watercraft light of claim 7 comprising an array of LEDs, wherein each LED is substantially equally spaced from one another and disposed centrally with the longitudinally extending watercraft light.

9. The longitudinally extending watercraft light of claim 8, wherein the second side of the housing has a centrally disposed slot opening or longitudinally extending light transmissible portion for the transferring of the light from each of the LEDs to the area to be illuminated.

10. The longitudinally extending watercraft light of claim 9 comprising a longitudinally extending light transmissible portion forming a substantially smoothed uninterrupted second side of the longitudinally extending watercraft light.

11. A watercraft lighting system comprising a plurality of the longitudinally extending watercraft lights of claim 1, wherein each of the electrical connecting lines are configured and disposed to electrically connect two of the longitudinally extending lights together or to electrically connect to a power source.

12. A method of installing a longitudinally extending watercraft light comprising the steps of:
   cutting and removing a portion of the rub rail bumper from the rub rail track;
   inserting an outwardly extending portion of the longitudinally extending watercraft light into the portion of the rub rail track having the rub rail bumper removed;
   abutting the cut ends of the rub rail bumper with ends of the longitudinally extending watercraft light and forming a substantially same outer perimeter with the rub rail bumper and the longitudinally extending watercraft light;
   connecting the longitudinally extending watercraft light to the watercraft; and
   electrically connecting the longitudinally extending watercraft light to a power source.

13. The method of installing a longitudinally extending watercraft light of claim 12, wherein the step of connecting the longitudinally extending watercraft light to the watercraft comprises fastening the longitudinally extending watercraft light to the watercraft with at least one fastener.

14. The method of installing a longitudinally extending watercraft light of claim 12, wherein the step of connecting the longitudinally extending watercraft light to the watercraft comprises snapping the outwardly extending portion of the longitudinally extending watercraft light into the rub rail track.

15. A longitudinally extending watercraft light bar adapted to fit in a rub rail;
   the rub rail comprises a rub rail bumper held in a rub rail track;
   the longitudinally extending watercraft light bar comprises:
      a first longitudinally extending light transmissible section;
      a second longitudinally extending section;
      a longitudinally extending PCB;
      an array of LEDs disposed on the PCB, wherein each LED in the array is substantially equally spaced from one another about a longitudinal axis of the PCB;
      the first longitudinally extending section and the second longitudinally extending section each having edges joined and substantially sealed together and housing the PCB with the array of LEDs proximate the first longitudinally extending section, disposing the LEDs to emit light though a light transmissible portion of the first longitudinal section;
      the first longitudinally extending section and the second longitudinally extending section are configured and disposed to be held within a perimeter of the rub rail bumper, with the second longitudinally extending section proximate the rub rail track,
      the first longitudinally extending section is configured and disposed to have its light transmissible portion disposed proximate an outer perimeter of the rub rail bumper; and
      electrical connecting lines extending from the PCB and out of the joined first and the second longitudinally extending sections.

16. The longitudinally extending watercraft light bar of claim 15, wherein the first longitudinally extending light transmissible section has a lens configured and disposed to refract light emitted from the array of LEDs.

17. The longitudinally extending watercraft light bar of claim 15, wherein the first longitudinally extending light transmissible section comprises a one way reflective material disposed about the array of LEDs.

18. The longitudinally extending watercraft light bar of claim 15, wherein the joined first and the second longitudinally extending sections and the PCB are flexible by an amount to flex the longitudinally extending watercraft light bar to fit within a curved rub rail bumper.

19. A watercraft lighting system comprising a plurality of the longitudinally extending watercraft light bars of claim 15, wherein each of the electrical connecting lines are configured and disposed to electrically connect two of the longitudinally extending light bars together or to electrically connect to a power source.

* * * * *